Aug. 25, 1931.     H. S. POTTER     1,820,245

ROCK DRILLING MACHINE OF THE HAMMER TYPE

Filed June 20, 1929

Inventor
Henry S. Potter
by Herbert W. Jenner,
Attorney.

Patented Aug. 25, 1931

1,820,245

UNITED STATES PATENT OFFICE

HENRY SAMUEL POTTER, OF JOHANNESBURG, SOUTH AFRICA

ROCK DRILLING MACHINE OF THE HAMMER TYPE

Application filed June 20, 1929, Serial No. 373,683, and in Union of South Africa June 26, 1928.

This invention has for its object to ensure adequate lubrication for the working parts of rock drills of the hammer type and especially the shank of the drill, the chuck and the forward extension of the piston.

According to this invention, the cylinder and front head are preferably of integral construction, and a space is provided on the exterior of the front head, having one or more chambers adapted to be filled with lubricant, the whole being covered with a contractible casing, so that the lubricant can be expressed by the operator through outlet ports to lubricate the various parts.

Further, according to the invention, the drill shank is fluted so as to co-act with a correspondingly splined chuck or a bushing inserted therein, a collar or shoulder being formed upon the drill shank at one or more suitable points to provide a longitudinal abutment for the said chuck or bushing.

Figure 1:
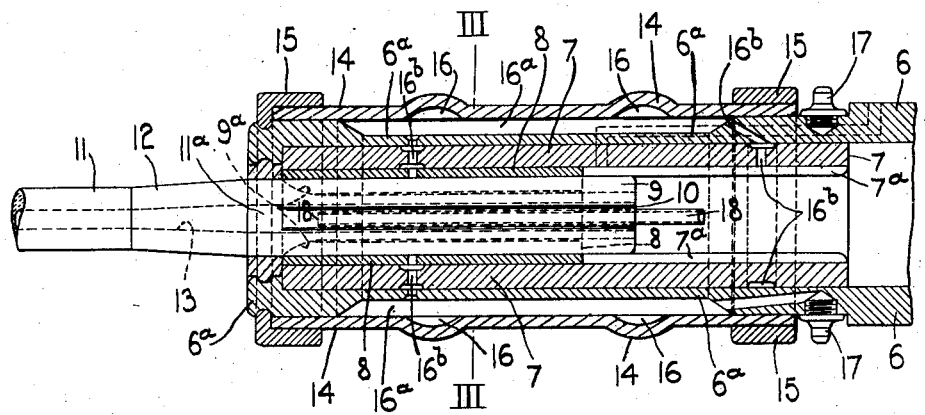
Figure 2:
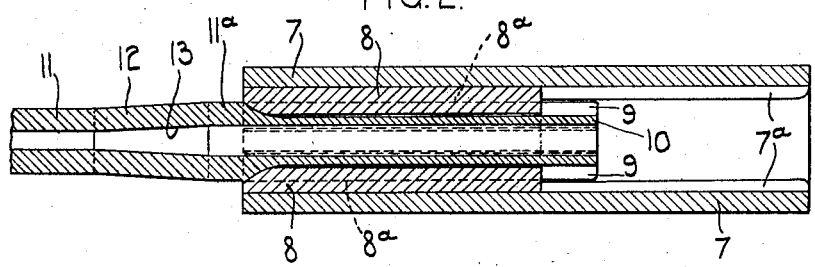
Figure 3:
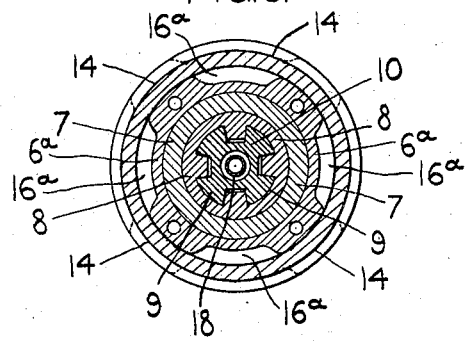
Figures 4, 5:
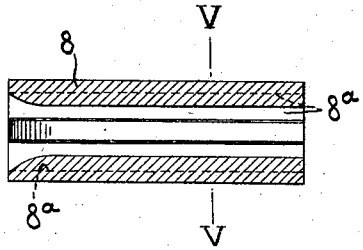

In the drawings, Fig. 1 is a longitudinal section of the front head of a rock drill constructed in accordance with the present invention, Fig. 2 is a detail view in section, illustrating the engagement of the drill shank with the chuck, Fig. 3 is a cross-section taken on the line III—III of Fig. 1, Fig. 4 is a detail view in section of the bushing, and Fig. 5 is a section thereof taken on the line V—V of Fig. 4.

Referring to the drawings, 6 indicates the casing of the cylinder, the extension 6a of which constitutes the front head of the drill. The chuck is rotatably mounted in the extension 6a and consists of a cylindrical sleeve 7 provided in its rearward part with a plurality of grooves or flutes 7a, or, alternatively, formed of polygonal shape, so as to be adapted to co-act with a corresponding formation on the nose of the piston (not shown). In the forward part of the sleeve 7 is pressed a bushing 8 provided in its interior with a plurality of longitudinal grooves 8a adapted to co-act with flutes 9 formed in the cylindrical portion 10 of the drill shank 11 by milling grooves therein.

The drill used consists of cylindrical hollow drill steel of as large a diameter as possible. The forward extension of the steel is rolled taper at 12, the taper being such as to give the minimum diameter at the back of the cutting edge and the taper hole 13 to give a high velocity jet of water at the point of the drill.

The cylindrical extension 10 of the drill shank is provided with a collar or shoulder at the root 11a of the extension for the purpose of providing an abutment for the bushing 8. This collar or shoulder is preferably formed by the ends 9a of the longitudinal grooves of the shank, the forward end of the bushing 8 being flared in such manner as to form a good fit with the curved portions 9a of said grooves.

14 indicates a contractible casing, e. g., of rubber or like resilient material, secured by clamping rings 15 upon the cylinder extension 6a, the formation of the casing and the arrangement being such that annular spaces 16 and axial spaces 16a are formed between the casing 14 and said extension 6a. Said annular space is filled with lubricant by means of a suitable grease gun through the nozzles 17, and the lubricant may be expressed through outlet ports and passages 16b to any of the working parts of the machine by the operator by squeezing the contractible casing 14. If desired, the casing 14 may be extended rearwardly over the whole of the cylinder 6 of the drill.

Further, the casing 14 constitutes a protective sleeve over the cylinder and front head of the machine for the purpose of preventing damage thereto by rough usage.

18 indicates the customary water tube which is inserted in the central hole of the drill shank.

The interior space of the chuck sleeve 7 may be connected with any approved means from exhausting air from it. This reduction of air pressure in the chuck sleeve assists in distributing the lubricant over the working surfaces of the slidable parts of the machine, and the air does not pass down the steel.

What I claim is:

1. In a rock drill, a front head, and a contractible casing secured around the front head and forming with it a chamber for lubricant, said head being provided with an outlet connecting the said chamber with the interior of the head and operating to supply it with lubricant when the casing is squeezed.

2. In a rock drill, a front head, a cylindrical casing of contractible material encircling the said head and forming with it a chamber for lubricant, and clamping rings securing the end portions of the casing on the head, said head being provided with an outlet connecting the said chamber with the interior of the head and operating to supply it with lubricant when the casing is squeezed.

3. In a rock drill, a front head provided externally with longitudinal spaces, and a contractible casing provided internally with annular spaces, said spaces forming a chamber for lubricant, and said head being provided with an outlet connecting the said chamber with the interior of the head and operating to supply it with lubricant when the casing is squeezed.

In testimony whereof, I have signed my name to this specification at Johannesburg, Union of South Africa, this 18th day of May, 1929.

HENRY SAMUEL POTTER.